(12) United States Patent
Keilwert et al.

(10) Patent No.: US 11,138,836 B2
(45) Date of Patent: Oct. 5, 2021

(54) SYSTEMS AND METHODS FOR PROVIDING A MULTI-PLAYER WAGERING GAME

(71) Applicant: IGT, Las Vegas, NV (US)

(72) Inventors: Stefan Keilwert, St. Josef (AT); Michael Russ, Graz (AT); Elisabeth Kiss, Unterpremstätten (AT); Lukas Angermayer, Graz (AT); Petra Wagner, Leibnitz (AT); Mihael Vurusic, Graz (AT); Werner Wagner, Heimschuh (AT); Marco Fink, Hartmannsdorf (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/852,497

(22) Filed: Dec. 22, 2017

(65) Prior Publication Data
US 2019/0197835 A1 Jun. 27, 2019

(51) Int. Cl.
*G07F 17/32* (2006.01)
*G02B 27/01* (2006.01)
*G06F 3/048* (2013.01)

(52) U.S. Cl.
CPC ....... *G07F 17/3272* (2013.01); *G02B 27/017* (2013.01); *G06F 3/048* (2013.01)

(58) Field of Classification Search
CPC .... G07F 17/3272; G06F 3/048; G02B 27/017
See application file for complete search history.

(56) References Cited

U.S. PATENT DOCUMENTS

| | | | |
|---|---|---|---|
| 8,821,274 B2 | 9/2014 | Lyons et al. | |
| 2002/0002074 A1* | 1/2002 | White | A63F 13/10 463/25 |
| 2003/0119576 A1* | 6/2003 | McClintic | G07F 17/32 463/20 |
| 2011/0212766 A1* | 9/2011 | Bowers | G07F 17/32 463/25 |

* cited by examiner

*Primary Examiner* — Milap Shah
*Assistant Examiner* — Thomas H Henry
(74) *Attorney, Agent, or Firm* — Sage Patent Group

(57) ABSTRACT

A method of providing a multi-player wagering game includes displaying, on at least one primary display device to at least one primary player, a primary game interface for the wagering game comprising a first plurality of game elements for facilitating play of the wagering game by the at least one primary player. The method also includes displaying, on at least one secondary display device to at least one secondary player, a secondary game interface for the wagering game comprising a second plurality of game elements for facilitating play of the wagering game by the at least one secondary player, wherein play of the wagering game by the at least one secondary player includes wagering on at least one outcome associated with play of the wagering game by the at least one primary player.

22 Claims, 6 Drawing Sheets

500 

DISPLAY, ON AT LEAST ONE PRIMARY DISPLAY DEVICE TO AT LEAST ONE PRIMARY PLAYER, A PRIMARY GAME INTERFACE FOR THE WAGERING GAME COMPRISING A FIRST PLURALITY OF GAME ELEMENTS FOR FACILITATING PLAY OF THE WAGERING GAME BY THE AT LEAST ONE PRIMARY PLAYER
502

DISPLAY, ON AT LEAST ONE SECONDARY DISPLAY DEVICE TO AT LEAST ONE SECONDARY PLAYER, A SECONDARY GAME INTERFACE FOR THE WAGERING GAME COMPRISING A SECOND PLURALITY OF GAME ELEMENTS FOR FACILITATING PLAY OF THE WAGERING GAME BY THE AT LEAST ONE SECONDARY PLAYER
504

FIG. 5

SYSTEMS AND METHODS FOR PROVIDING A MULTI-PLAYER WAGERING GAME

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to a wagering game, and in particular to systems and methods for providing a multi-player wagering game.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three-dimensional display screens.

SUMMARY

According to an embodiment, a system for providing a multi-player wagering game, the system comprises a memory and a processor coupled to the memory. The processor is configured to display, on at least one primary display device to at least one primary player, a primary game interface for the wagering game comprising a first plurality of game elements for facilitating play of the wagering game by the at least one primary player. The processor is further configured to display, on at least one secondary display device to at least one secondary player, a secondary game interface for the wagering game comprising a second plurality of game elements for facilitating play of the wagering game by the at least one secondary player, wherein play of the wagering game by the at least one secondary player comprises wagering on at least one outcome associated with play of the wagering game by the at least one primary player.

According to another embodiment, the at least one primary display device is configured to be viewed by the at least one primary player and the at least one secondary player simultaneously during play of the wagering game.

According to another embodiment, the at least one primary player is at least two primary players. The at least one primary display device is a shared primary display device configured to be viewed by the at least two primary players simultaneously during play of the wagering game.

According to another embodiment, each of the at least one primary display device is part of a head mounted display configured to be worn by a respective one of the at least one primary player.

According to another embodiment, the head mounted display is one of a virtual reality (VR) display or an augmented reality (AR) display.

According to another embodiment, the processor is further configured to display, on a tertiary display device, a tertiary game interface for the wagering game comprising a tertiary plurality of game elements for facilitating viewing of the wagering game by at least one spectator.

According to another embodiment, the at least one spectator is the at least one secondary player, wherein the tertiary game interface facilitates play of the wagering game by the at least one secondary player.

According to another embodiment, each at least one secondary display device is part of a respective mobile device.

According to another embodiment, the respective mobile device is one of a handheld tablet or a smartphone.

According to another embodiment, the outcome associated with play of the wagering game by the at least one primary player comprises the at least one primary player achieving at least one game objective associated with play of the wagering game.

According to another embodiment, play of the wagering game by the at least one secondary player comprises the at least one secondary player helping the at least one primary player achieve the at least one game objective.

According to another embodiment, play of the wagering game by the at least one primary player comprises a contest between the at least one primary player and at least one opponent, wherein the at least one game objective comprises winning the contest.

According to another embodiment, the at least one primary player comprises a first primary player on a first team and a second primary player on a second team, wherein the at least one secondary player comprises a first secondary player on the first team.

According to another embodiment, the at least one secondary player comprises a second secondary player on the second team.

According to another embodiment, the first plurality of game elements comprises a plurality of common game elements and the second plurality of game elements comprises the plurality of common game elements.

According to another embodiment, a method of providing a multi-player wagering game comprises displaying, on at least one primary display device to at least one primary player, a primary game interface for the wagering game comprising a first plurality of game elements for facilitating play of the wagering game by the at least one primary player. The method further comprises displaying, on at least one secondary display device to at least one secondary player, a secondary game interface for the wagering game comprising a second plurality of game elements for facilitating play of the wagering game by the at least one secondary player, wherein play of the wagering game by the at least one secondary player comprises wagering on at least one outcome associated with play of the wagering game by the at least one primary player.

According to another embodiment, the at least one primary display device is configured to be viewed by the at least one primary player and the at least one secondary player simultaneously during play of the wagering game.

According to another embodiment, the at least one primary player is at least two primary players. The at least one primary display device is a shared primary display device configured to be viewed by the at least two primary players simultaneously during play of the wagering game.

According to another embodiment, each of the at least one primary display device is part of a head mounted display configured to be worn by a respective one of the at least one primary player.

According to another embodiment, a non-transitory computer readable medium comprises instructions configured to cause a processing device to execute a method of providing a multi-player wagering game. The method comprises displaying, on at least one primary display device to at least one primary player, a primary game interface for the wagering game comprising a first plurality of game elements for facilitating play of the wagering game by the at least one primary player. The method further comprises displaying, on at least one secondary display device to at least one secondary player, a secondary game interface for the wagering game comprising a second plurality of game elements for facilitating play of the wagering game by the at least one secondary player, wherein play of the wagering game by the at least one secondary player comprises wagering on at least one outcome associated with play of the wagering game by the at least one primary player.

BRIEF DESCRIPTION OF THE DRAWINGS

FIG. 5 is a flowchart diagram of a method of providing a multi-player wagering game, according to an embodiment, according to an embodiment.

DETAILED DESCRIPTION

Embodiments described herein relate to a wagering game, and in particular to systems and methods for providing a multi-player wagering game. According to an embodiment, a method of providing a multi-player wagering display includes displaying, on at least one primary display device to at least one primary player, a primary game interface for the wagering game comprising a first plurality of game elements for facilitating play of the wagering game by the at least one primary player. The method also includes displaying, on at least one secondary display device to at least one secondary player, a secondary game interface for the wagering game comprising a second plurality of game elements for facilitating play of the wagering game by the at least one secondary player, wherein play of the wagering game by the at least one secondary player includes wagering on at least one outcome associated with play of the wagering game by the at least one primary player.

Figure 1:
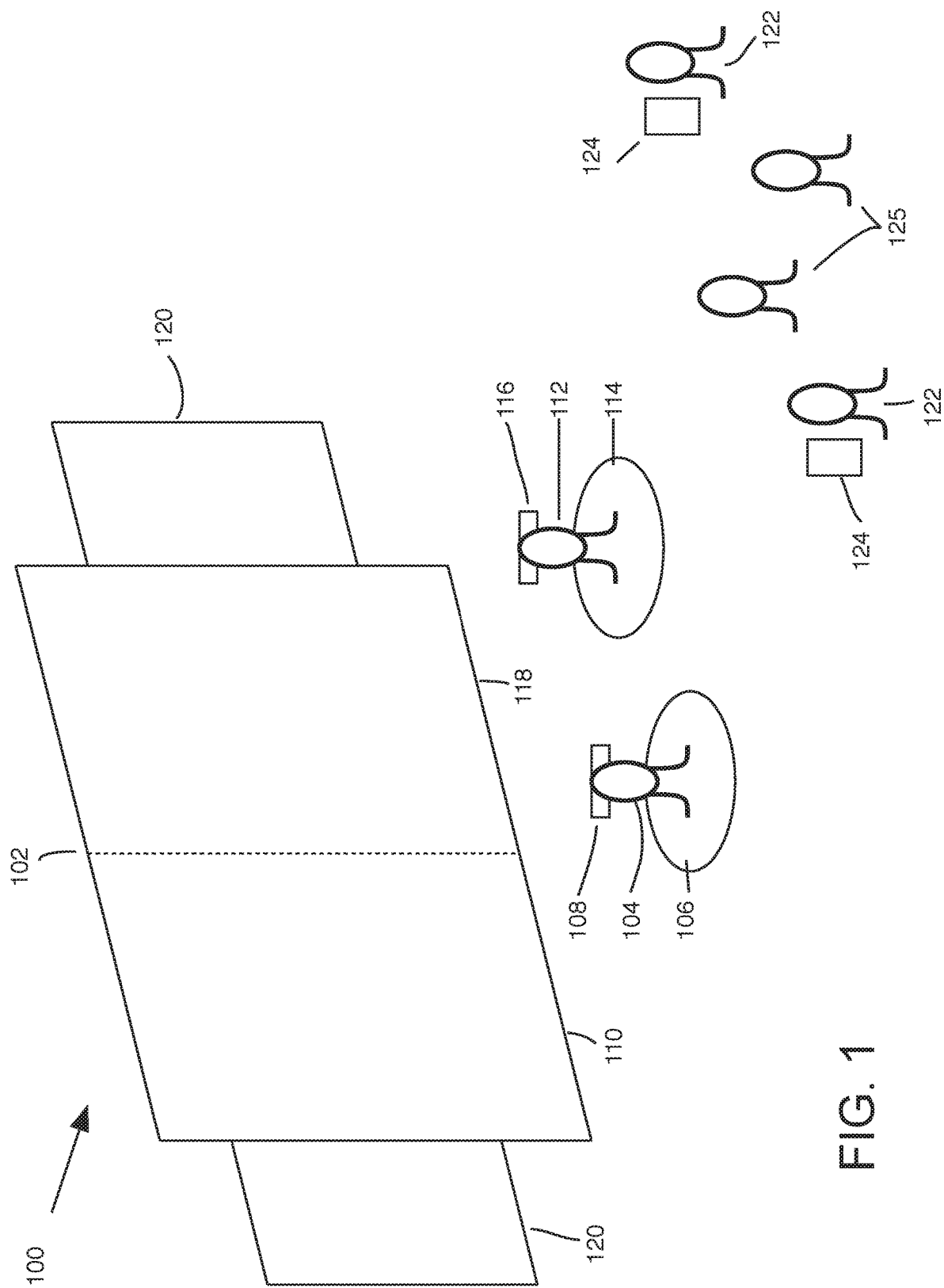
FIG. 1 illustrates a view of a gaming system for providing a multi-player wagering game, according to an embodiment.

In this regard, FIG. 1 illustrates a view of a gaming system 100 for providing a multi-player wagering game, according to an embodiment. The gaming system 100 includes a primary display 102, which may be a large-scale display viewable by a plurality of players and spectators. A first primary player 104 located at a first player station 106 may also wear a head-mounted first augmented reality (AR) viewer 108, which may provide additional visual and auditory information to the first primary player 104, in addition to the visual information provided by a first player display section 110 of the primary display 102. A second primary player 112 located as a second player station 114 may also wear a head-mounted first augmented reality (AR) viewer 116, which may likewise supplement a second player display section 118 of the primary display 102. In addition to the primary display 102, one or more supplemental displays 120 viewable by multiple players and spectators may also be provided, for providing a leaderboard, game results, etc.

The gaming system 100 also allows one or more secondary players 122 to participate in the wagering game, via one or more secondary player devices 124. In this embodiment, the secondary player device 124 is a tablet device that allows the secondary player 122, who may be a spectator viewing the primary display 102 and/or the first and second primary players 104, 112 to interact with the wagering game.

In some embodiments, the primary display 102 displays a primary game interface for the wagering game for facilitating play of the wagering game by the first and second primary players 104, 112. In the embodiment of FIG. 1, the primary display 102 is a shared display configured to be viewed by both first and second primary players 104, 112 simultaneously during play of the wagering game, e.g. by providing dedicated first and second player display sections 110, 118. In this embodiment, the primary display 102 is also configured to be viewed by the secondary players 122 during play of the wagering game at the same time. In another embodiment, the primary display 102 may be a spectator display for displaying game elements of the wagering game to one or more spectators 125, with or without facilitating direct participation by the primary or secondary players 104, 112, 122, or the spectators 125.

In this embodiment as well, the respective first and second AR viewers 108, 116 are also configured to provide elements of a primary gaming interface for the wagering game for facilitating play of the wagering game by the first and second primary players 104, 112. In this example, the primary display 102 and respective first and second AR viewers 108, 116 work together to provide a full primary gaming interface for the respective first and second primary players 104, 112, but it should be understood that a primary game interface may be provided to a primary player in other ways as well. For example, the complete primary player interface may be provided via the primary display 102, or more fully-immersive head-mounted virtual-reality (VR) viewers could be substituted for the respective first and second AR viewers 108, 116 to provide the full primary game interface.

In this embodiment, the secondary player device 124 may be a mobile device, such as a handheld tablet or mobile phone for example, configured to providing a secondary game interface for the wagering game for facilitating play of the wagering game by the secondary player 122. In this example, play of the wagering game by the secondary player 122 comprises wagering on at least one outcome associated with play of the wagering game by the first or second primary player 104, 112. For example, the outcome associated with play of the wagering game by the first primary player 104 may include the first primary player 104 achieving at least one game objective associated with play of the wagering game. Play of the wagering game by the secondary player 122 may include the secondary player 122 helping the first primary player 104 achieve the game objective. Play of the wagering game may also include a contest between the first primary player 104 and the second primary player 112 and/or another opponent, with the game objective being to win the contest. In some embodiments, the first primary player 104 may be on a first team and the second primary player 112 may be on a second team, with respective secondary players 122 supporting different teams.

Figure 2:
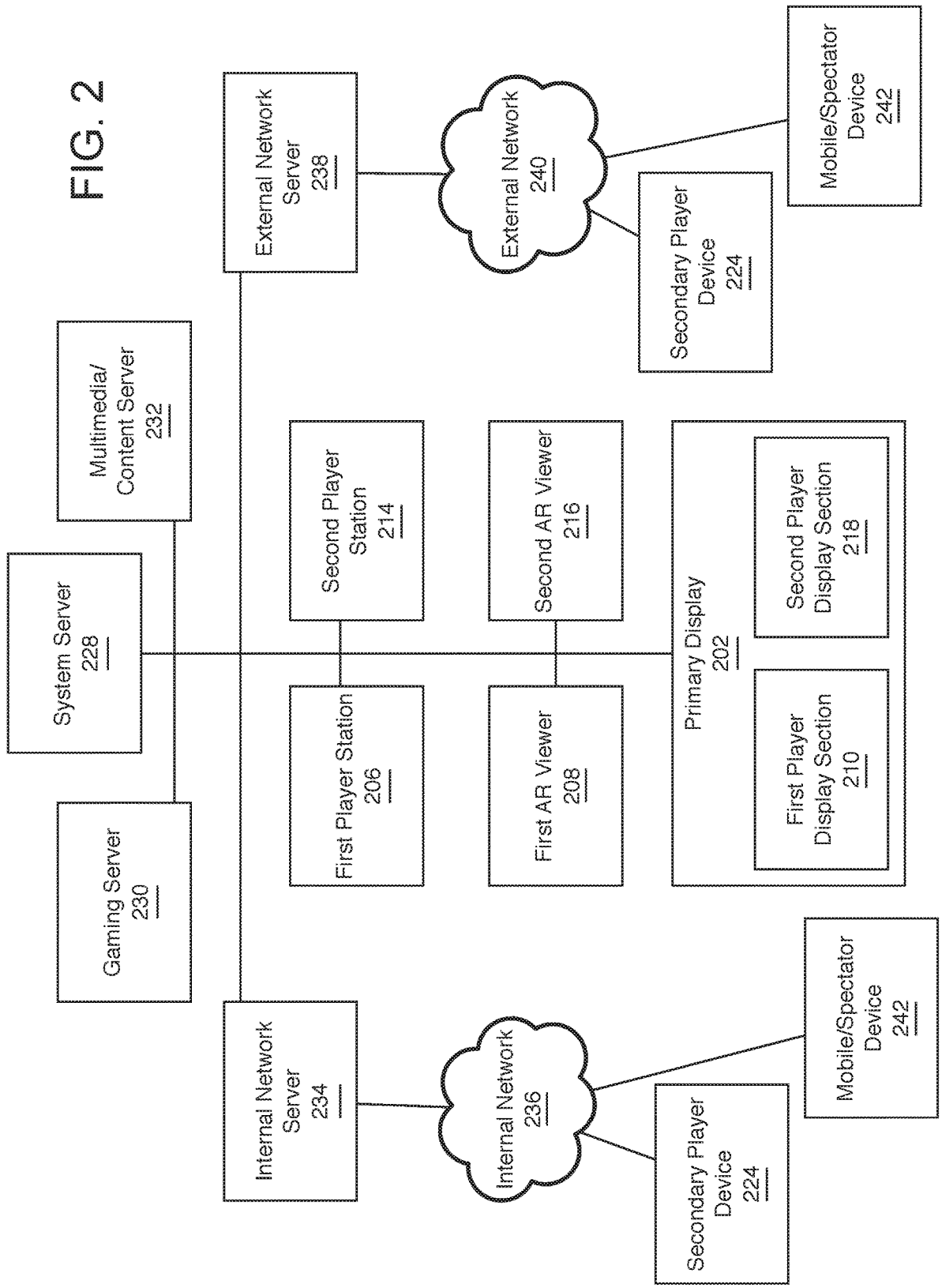
FIG. 2 illustrates a schematic diagram of a gaming system, similar to the gaming system of FIG. 1, illustrating elements of the gaming system on a network, according to an embodiment.

The gaming system may be server-based, and may be located entirely within a local network, such as on a single casino property, or across a wider network, such as a multi-property network or the Internet. In this regard, FIG. 2 illustrates a schematic diagram of a gaming system 200, similar to the gaming system 100 of FIG. 1, illustrating elements of the gaming system 200 on a network 226. In the gaming system 200, a system server 228 manages the overall gaming system 200, and coordinates the other network-connected elements of the gaming system 200 with each other.

In this regard, a gaming server 230 manages aspects of wagering game itself, including game play and resolving game results, as well as receiving wagers and paying out winnings. Aspects of the game play, such as common game elements relating to game play by all players, may be displayed on the primary display 202, where the common game elements may be viewed by all players. Other aspects of the game play, such as game elements specific to certain players, may also be displayed on the primary display 202, such as in the first or second player display sections 210, 218 of the primary display 202. Game elements specific to certain players, may also be displayed on devices specific to those players, such as such as the first AR viewer 208 and/or the second AR viewer 212, and/or the secondary player device 224, for example. Each player may interact with the game via a respective player interface, such as the first and second AR viewers 208, 212, first and second player stations 206, 214, and/or the secondary player device 224, for example. Additional game elements and/or other information may be provided to one or more players and/or spectators via the supplemental display 220 and/or additional spectator devices 242, such as tablets or mobile phones, for example.

The system server 228 may also be coupled to a multimedia content server 232, which may be used to provide audio and/or video content to one or more of the game interfaces and/or displays in the gaming system 200. The system server 228 may also be coupled to an internal network server 234 that is configured to manage network traffic within a closed internal network 236, for example, within a casino property intranet. By closing off the internal network 236, security of the internal network 236 and the devices connected thereto, such as the system server 228 and gaming server 230, for example, may be increased. A separate external network server 238 may also be coupled to the system server 228, with the external network server 238 being configured to manage network traffic with an external network 240, such as a multi-property network and/or the Internet.

Figure 3:
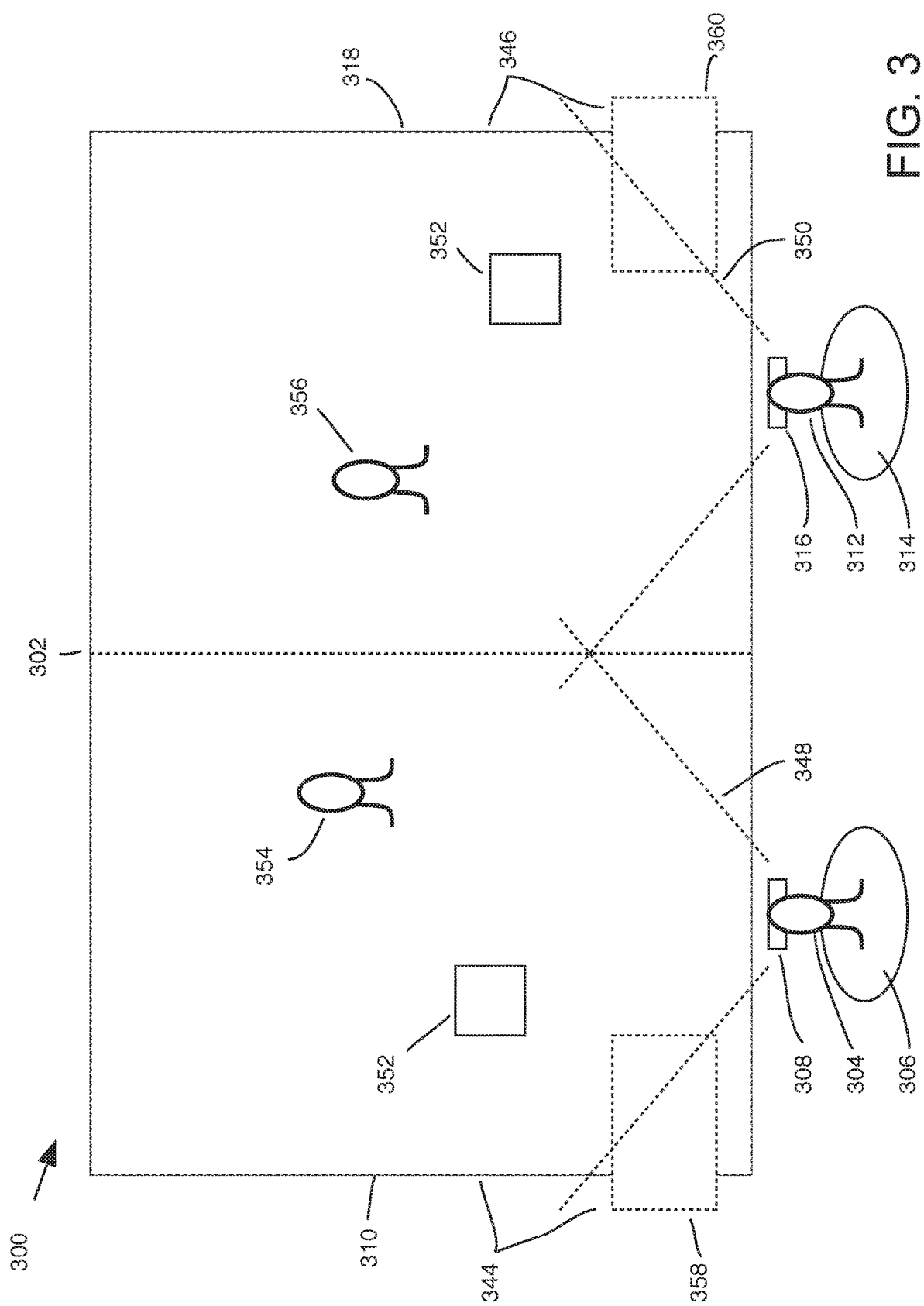
FIG. 3 illustrates a view of a gaming system, similar to the gaming systems of FIGS. 1 and 2, illustrating a primary display having a first primary game interface and a second primary game interface, according to an embodiment.

Referring now to FIG. 3, a view of a gaming system 300, similar to the gaming systems 100, 200 of FIGS. 1 and 2, illustrates a primary display 302 having a first primary game interface 344 and a second primary game interface 346. The first primary game interface 344 is provided to the first primary player 304 at the first player station 306 via the first player display section 310 and the first AR viewer 308, and the second primary game interface 346 is provided to the second primary player 312 at the second player station 314 via the second player display section 318 and the second AR viewer 316. For the first primary game interface 344, the first player display section 310 and the first AR viewer 308 define a first scene 348 within a field of view (FOV) of the first primary player 304. The first scene 348 may also include other elements that are visible to the first primary player 304, such as portions of the second player display section 318, for example. In this example, the first primary game interface 344 may include one or more common game elements 352, such as a game object or environmental element, and may also include a second primary player avatar 354, representative of the second primary player 312, and/or an avatar of another player and/or non-player character (NPC). The first primary game interface 344 may also include one or more first AR elements 358 provided by the first AR viewer 308, or other game elements that are only provided to the first primary game interface 344.

Similarly, for the second primary game interface 346, the second player display section 318 and the second AR viewer 316 define a second scene 350 within a field of view (FOV) of the second primary player 312. The second scene 350 may also include other elements that are visible to the second primary player 312, such as portions of the first player display section 310, for example. In this example, the second primary game interface 346 may include one or more of the common game elements 352, and may also include a first primary player avatar 356, representative of the first primary player 304, and/or an avatar of another player and/or NPC. The second primary game interface 346 may also include one or more second AR elements 360 provided by the second AR viewer 316, or other game elements that are only provided to the second primary game interface 346.

Figure 4:
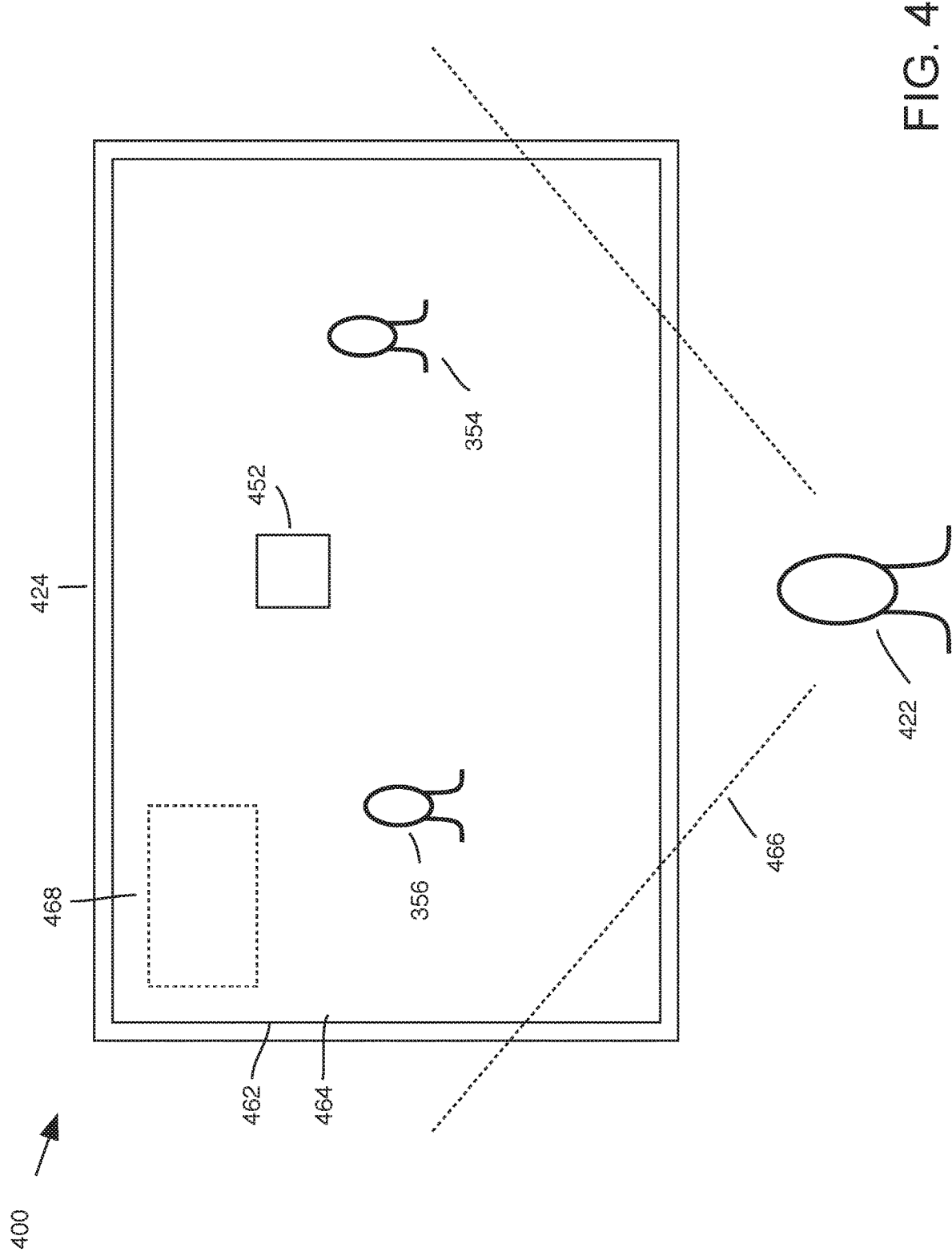
FIG. 4 illustrates a view of a gaming system, similar to the gaming systems of FIGS. 1-3, illustrating a secondary display having a secondary game interface, according to an embodiment.

Referring now to FIG. 4, a view of a gaming system 400, similar to the gaming systems 100, 200, 300 of FIGS. 1-3, illustrates a secondary game interface 464 provided to the secondary player 422 via a secondary display 462 of the secondary player device 424. For the secondary game interface 464, the secondary display 462 defines a scene 466 within a field of view (FOV) of the secondary player 422. The scene 466 may also include other elements that are visible to the secondary player 422, such as portions of the primary display 302 of FIG. 3, for example. In this example, the secondary game interface 464 of FIG. 4 may include one or more common game elements 452, which may be the same common game elements 352 that appear in the first and second primary game interfaces 344, 346 of FIG. 3, such as a game object or environmental element for example. The secondary game interface 464 of FIG. 4 may also include a first and second primary player avatar 454, 456, similar to the first and second primary player avatars 354, 356 of FIG. 3, and/or an avatar of another player and/or non-player character (NPC). The secondary game interface 464 may also include one or more secondary game elements 468 that are provided only to the secondary game interface 464. It should be understood that additional interfaces, such as a tertiary interface, may be provided to one or more spectators via spectator devices, using one or more of the elements disclosed above with respect to FIGS. 3 and 4, to provide a way for the spectators and/or additional players to view aspects of the wagering game, with or without participating in the wagering game.

The above-described features can be used to facilitate a variety of game modes, such as cooperative play modes in which players cooperate and help each other to achieve a mutually beneficial outcome, and competitive play modes in which players compete against each other as individuals and/or as teams to achieve favorable outcomes at the expense of other players. In some embodiments, players may interact with each other, including using the game interface, which may be part of a mobile app, to invite other players to participate in the wagering game. Other potential players in the casino can be located via the game interface, and accepted invitations can enhance the bets or potential outcomes for existing players. By incorporating player skill and cooperative and/or competitive elements, players may perceive a greater sense of control over the outcomes over games that rely entirely on random chance.

A social betting feature may facilitate a plurality of players betting together on a particular player. A player betting on a particular player may also be able to interact with the game to help the particular player and hinder other competing players or NPCs. A player can also sponsor another player, e.g., by sending credits to the player or by spending credits to increase the player's chances of achieving a particular outcome. A player may also stream some or all of his game interface to other devices, such as a primary player streaming a VR interface from a VR viewer to another player's or a spectator's mobile device. A player may also share a still image of video of his game interface on social media and/or another player's display, such as the primary display. A live chat function may be selectively displayed on one or more display devices of the players or spectators. Spectators may also move around freely within a game area without interfering or affecting game play by the players, and the spectators may be undetectable, i.e., invisible, to the players. In other examples, player avatars may appear as in-game opponents, e.g., zombies or monsters with the players' faces, with rewards for defeating the other players' avatars during gameplay.

In some embodiments, a secondary player can be a coach for a respective primary player, e.g., giving hints or other aid to the primary player. Opposing coaches may compete against each other in some embodiments. Spectators can also participate by helping primary or secondary players or hindering opposing players, and spectators can bet on individual players or teams as well. Hidden and/or secret game elements, i.e., Easter eggs, may be present in the game, and may be found or achieved by players during play of the wagering game, thereby helping the players or hindering opponents. In some embodiments, the more players and/or spectators join a team, the more features and/or upgrades may be available to a primary player. The addition of a threshold number of players, spectators, and/or bets may also trigger a special event and/or minigame. Players may also pool their bets or place combination bets in with other players.

In some embodiments, the outcome may be part of a multi-part challenge, e.g., in a tournament format with a tournament bracket. In some examples, players may collect items or other game elements to support other players. Secondary players may compete against each other to become the next primary players. Secondary players may also interact with the game play of a primary player, for example to take action or spend a bonus credit to prevent a death of a primary player's avatar in the game, or to steer a vehicle carrying a primary player's avatar.

In some embodiments, betting by players can be managed and/or automated according to predetermined criteria. For example, a game interface may be configured to continue betting for a player that has stepped away from the game device. Betting levels and wager amounts may be managed and/or capped based on player skill and/or experience. New players may be granted sign-up or acquisition bonuses for free or discounted play. Players may also be rewarded for bringing additional players into the game. Mystery jackpots and bonus games may occur at predetermined or random times or in response to certain predetermined or random events. Bets may be placed on a variety of different game events not necessarily tied to the primary game outcome. In a tournament mode, betting on the overall winner earlier in the tournament may result in a larger payout.

A variety of payment and payout mechanisms may be employed, including internet-based payment, such as PayPal®, or bitcoin, and the system may be used to pay for incidental non-gaming items, such as drinks or food, as well. Retail and service receipts may also contain a code for free or discounted play of the wagering game. A player may implement betting limits that may limit total bets, winnings, or losses. Credits or funds can also be transferred between players and spectators.

The game interface may also allow for customization of a player's game play experience. Playing more often may gain experience points for a player, which may be used to enhance aspects of a player's avatar or game play experience. A player and/or team may create a customized team logo, player avatar, and/or other game elements. The game interface can display player information, statistics, skill levels, bet amounts, global rankings, and other information. Regular play may be rewarded with daily rewards such as a mini-game, enhanced odds, enhanced payouts, social points, and other benefits. Players can exchange game data by connecting their respective devices through a wired or wireless (e.g. near-field communication (NFC)) connection.

A variety of organizational and social media features may be integrated into the game interface. These features may include: live or upcoming event announcements, in-app advertisements, calendar and map integration, calendar reminders, social media links, photo and video galleries, free or "freemium" versions of the wagering game, game registration and waiting list functionality, voting on game format, game rules and descriptions, text, audio, and/or video chat, and/or feedback based on in-game events.

Referring now to FIG. 5, a method 500 of providing a multi-player wagering game is disclosed. The method 500 includes displaying, on at least one primary display device to at least one primary player, a primary game interface for the wagering game comprising a first plurality of game elements for facilitating play of the wagering game by the at least one primary player (block 502). The method 500 further comprises displaying, on at least one secondary display device to at least one secondary player, a secondary game interface for the wagering game comprising a second plurality of game elements for facilitating play of the wagering game by the at least one secondary player (block 504). In this embodiment, play of the wagering game by the at least one secondary player comprises wagering on at least one outcome associated with play of the wagering game by the at least one primary player.

Figure 6:
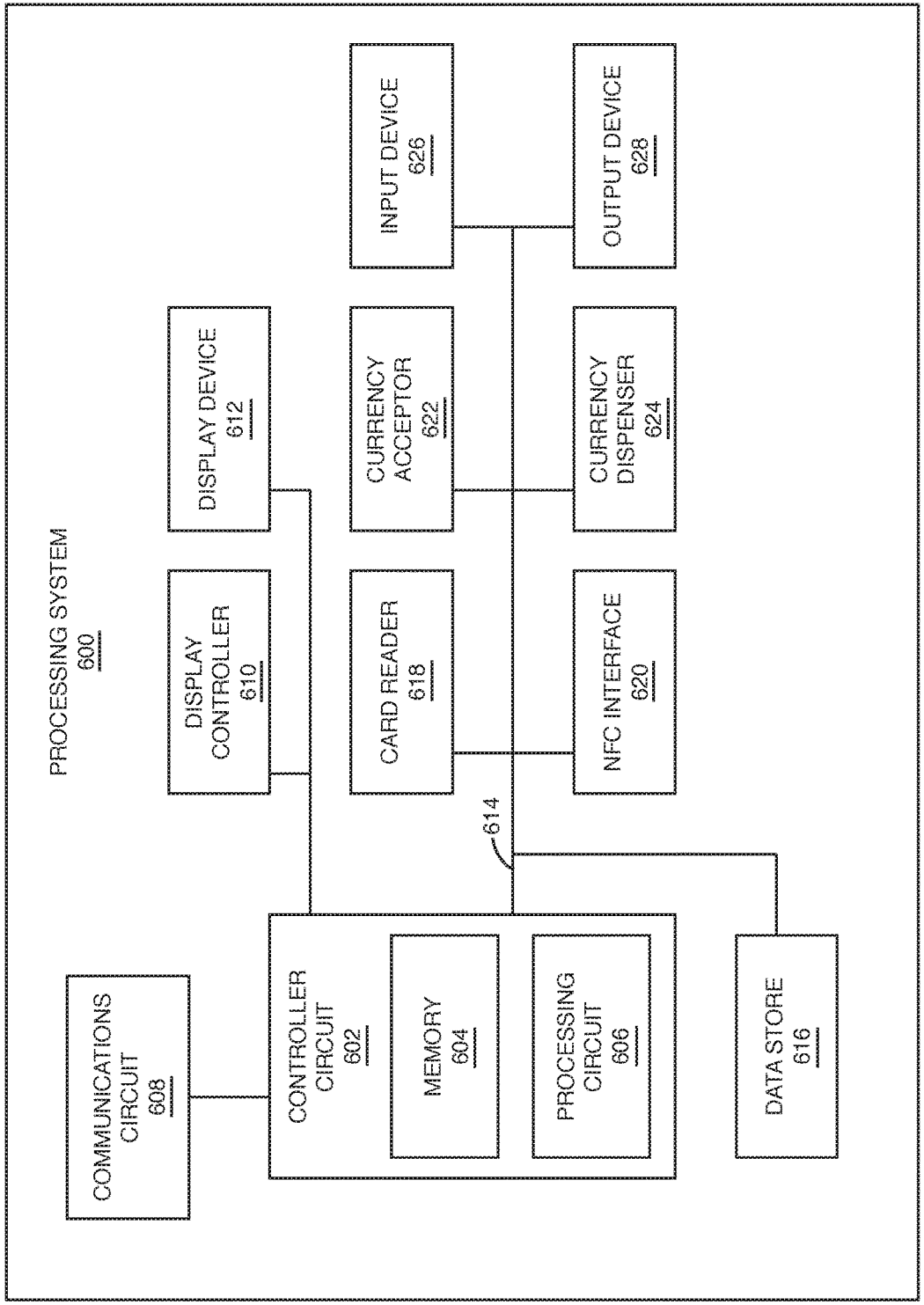
FIG. 6 is a diagram of a processing system that may be used with embodiments described herein, according to an embodiment.

As discussed above, the above features may be embodied in hardware, software, or a combination thereof. In this regard, FIG. 6 is a diagram of a processing system 600 that may be used with embodiments described herein, according to an embodiment. The processing system 600 includes a controller circuit 602 having a memory 604 and a processor circuit 606. A communications circuit 608 may contain circuitry for coupling the processing system 600 to network. The communications circuit 608 may include a network interface allowing processing system 600 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The processing system 800 may communicate over a network using a suitable protocol.

The communications circuit 608 may communicate, transmit and receive data using a wireless transmitter, and/or it may be wired to a network, such as a local area network running throughout the casino floor, for example. The communications circuit 608 may set up a communication link with a master controller and may buffer data between the network and the controller circuit 602. The communications circuit 608 may also communicate with a network server for exchanging information to carry out embodiments described herein.

The controller circuit 602 includes a memory 604 and a processor circuit 606 for carrying out program instructions stored in the memory and for providing the information requested by the network. The processor circuit 606 may be a multi-core processor including two or more independent processing units. Each of the cores in the processor circuit 606 may support multi-threading operations, i.e., may have the capability to execute multiple processes and/or threads concurrently. Additionally, the processor circuit 606 may have an on-board memory cache. An example of a suitable multi-core, multithreaded processor circuit is an Intel® Core i7-7920HQ processor, which has four cores that support eight threads each and has an 8 MB on-board cache. The controller circuit 602 executes processes and cooperates with a display controller 610 to control one or more of display device 612 to display a viewing area and provide information to a user.

Peripheral devices/boards in the processing system 600 may communicate with the controller circuit 602 via a bus 614 using, for example, an RS-232 interface. Such peripherals may include an electronic data store 616, which may, for example, include a set of machine readable instructions for performing some or all of the features of the processes and methods disclosed herein. The electronic data store 616 may reside in a data storage device, e.g., a hard disk drive, a solid-state drive, or the like. Such a data storage device may be included in processing device, and/or may reside on a remote system. In some embodiments, the electronic data store storing game data may reside in the cloud.

Other peripherals may include a smart card reader and/or other type of credit card reader 618, a near field communication (NFC) and/or other wireless interface, a bill, coin, and/or other currency acceptor 622, a bill, coin, and/or other currency dispenser 624, and/or other input devices 626 and output devices 628, such as buttons, a touch screen, gesture tracking hardware, audio speakers, and/or microphones, for example.

The card reader 618 reads cards for player and credit information for one or more aspects of the cashless wallets described herein. For example, the card reader 818 may read a magnetic code on a conventional player tracking card, where the code uniquely identifies the player to a host system at the venue. The code is cross-referenced to any data related to the player. The card reader 618 may also include an optical reader and printer for reading and printing coded barcodes and other information on a paper ticket. A card may also include credentials that enable the processing system 600 and/or network-connected host system to access one or more accounts associated with a user.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A system for providing a multi-player wagering game, the system comprising:
   a memory; and
   a processor coupled to the memory, the processor configured to:
      display, on at least one primary display device to at least one primary player, a primary game interface for the wagering game comprising a first plurality of game elements for facilitating play of the wagering game by the at least one primary player, wherein the at least one primary display device is viewable by the at least one primary player and at least one secondary player simultaneously during play of the wagering game; and
      display, on at least one secondary display device to the at least one secondary player, a secondary game interface for the wagering game comprising a second plurality of game elements that are different than the first plurality of game elements for facilitating a different style of play of the wagering game by the at least one secondary player than by the at least one primary player,
      wherein play of the wagering game by the at least one secondary player comprises wagering on at least one outcome associated with play of the wagering game by the at least one primary player,
      wherein the at least one outcome associated with play of the wagering game by the at least one primary player comprises the at least one primary player achieving at least one game objective associated with play of the wagering game, and
      wherein play of the wagering game by the at least one secondary player comprises the at least one secondary player helping the at least one primary player achieve the at least one game objective.

2. The system of claim 1, wherein the at least one primary player is at least two primary players, and
   wherein the at least one primary display device is a shared primary display device configured to be viewed by the at least two primary players simultaneously during play of the wagering game.

3. The system of claim 1, wherein each of the at least one primary display devices is part of a head mounted display configured to be worn by a respective one of the at least one primary players.

4. The system of claim 3, wherein the head mounted display is one of a virtual reality (VR) display or an augmented reality (AR) display.

5. The system of claim 3, wherein the processor is further configured to display, on a tertiary display device, a tertiary game interface for the wagering game comprising a tertiary plurality of game elements for facilitating viewing of the wagering game by at least one spectator.

6. The system of claim 5, wherein the at least one spectator is the at least one secondary player, wherein the tertiary game interface facilitates play of the wagering game by the at least one secondary player.

7. The system of claim 1, wherein each at least one secondary display device is part of a respective mobile device.

8. The system of claim 7, wherein the respective mobile device is one of a handheld tablet or a smartphone.

9. The system of claim 1, wherein play of the wagering game by the at least one primary player comprises a contest between the at least one primary player and at least one opponent, wherein the at least one game objective comprises winning the contest.

10. The system of claim 9, wherein the at least one primary player comprises a first primary player on a first team and a second primary player on a second team, wherein play of the wagering game by the first primary player and the second primary player comprises a contest between the first primary player and the second primary player, and
wherein the at least one secondary player is separate from the first primary player and the second primary player.

11. The system of claim 1, wherein the at least one primary player comprises a first primary player on a first team and a second primary player on a second team, wherein the at least one secondary player comprises a first secondary player on the first team.

12. The system of claim 11, wherein the at least one secondary player comprises a second secondary player on the second team.

13. The system of claim 1, wherein the first plurality of game elements comprises a plurality of common game elements and the second plurality of game elements comprises the plurality of common game elements.

14. The system of claim 1, wherein the at least one secondary display device is of a different type than the primary display device, and wherein the at least one secondary display device is of a different size than the primary display device.

15. The system of claim 1, wherein the at least one secondary player comprises a first secondary player on the first team and a second secondary player on the second team, wherein play of the wagering game by the first secondary player and the second secondary player comprises a contest between the first secondary player and the second secondary player.

16. The system of claim 1, wherein helping the at least one primary player achieve the at least one game objective comprises the wagering game providing the at least one primary player with a virtual item in response to play by the at least one secondary player.

17. A method of providing a multi-player wagering game, the method comprising:
displaying, on at least one primary display device to at least one primary player, a primary game interface for the wagering game comprising a first plurality of game elements for facilitating play of the wagering game by the at least one primary player, wherein the at least one primary display device is viewable by the at least one primary player and at least one secondary player simultaneously during play of the wagering game; and
displaying, on at least one secondary display device to the at least one secondary player, a secondary game interface for the wagering game comprising a second plurality of game elements that are different than the first plurality of game elements for facilitating a different style of play of the wagering game by the at least one secondary player than by the at least one primary player, wherein play of the wagering game by the at least one secondary player comprises wagering on at least one outcome associated with play of the wagering game by the at least one primary player,
wherein the at least one outcome associated with play of the wagering game by the at least one primary player comprises the at least one primary player achieving at least one game objective associated with play of the wagering game, and
wherein play of the wagering game by the at least one secondary player comprises the at least one secondary player helping the at least one primary player achieve the at least one game objective.

18. The method of claim 17, wherein the at least one primary player is at least two primary players, and
wherein the at least one primary display device is a shared primary display device configured to be viewed by the at least two primary players simultaneously during play of the wagering game.

19. The method of claim 17, wherein each of the at least one primary display devices is part of a head mounted display configured to be worn by a respective one of the at least one primary players.

20. The method of claim 17, wherein play of the wagering game by the at least one primary player comprises a contest between the at least one primary player and at least one opponent, wherein the at least one game objective comprises winning the contest.

21. The system of claim 20, wherein the at least one primary player comprises a first primary player on a first team and a second primary player on a second team,
wherein play of the wagering game by the first primary player and the second primary player comprises a contest between the first primary player and the second primary player, and
wherein the at least one secondary player is separate from the first primary player and the second primary player.

22. A non-transitory computer readable medium comprising instructions configured to cause a processing device to execute a method of providing a multi-player wagering game, the method comprising:
displaying, on at least one primary display device to at least one primary player, a primary game interface for the wagering game comprising a first plurality of game elements for facilitating play of the wagering game by the at least one primary player, wherein the at least one primary display device is configured to be viewed by the at least one primary player the at least one secondary player simultaneously during play of the wagering game; and
displaying, on at least one secondary display device to the at least one secondary player, a secondary game interface for the wagering game comprising a second plurality of game elements that are different than the first plurality of game elements for facilitating a different style of play of the wagering game by the at least one secondary player than by the at least one primary player, wherein play of the wagering game by the at least one secondary player comprises wagering on at least one outcome associated with play of the wagering game by the at least one primary player,
wherein the at least one outcome associated with play of the wagering game by the at least one primary player comprises the at least one primary player achieving at least one game objective associated with play of the wagering game, and
wherein play of the wagering game by the at least one secondary player comprises the at least one secondary player helping the at least one primary player achieve the at least one game objective.

\* \* \* \* \*